Figure 1:
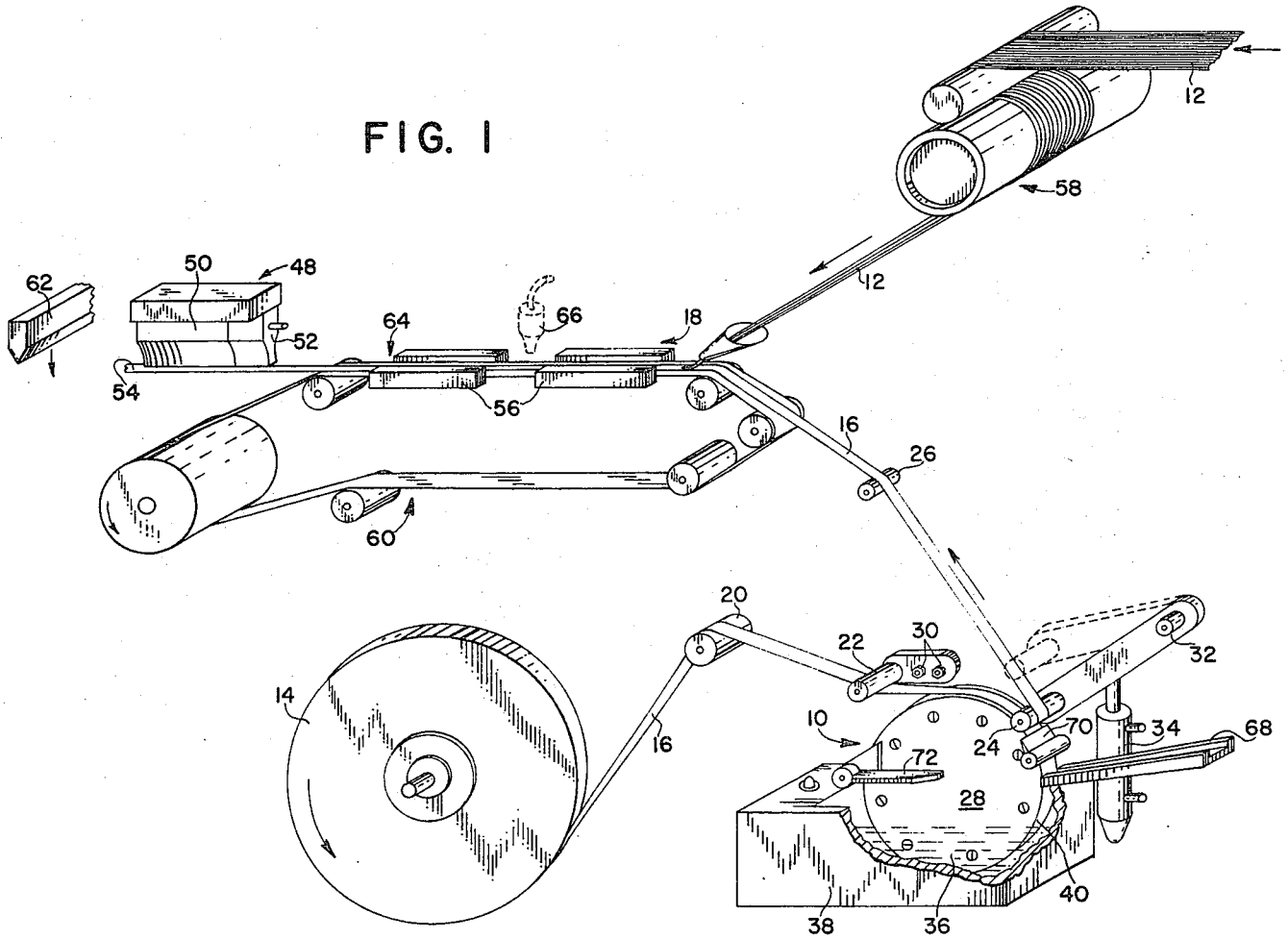
Figure 2:
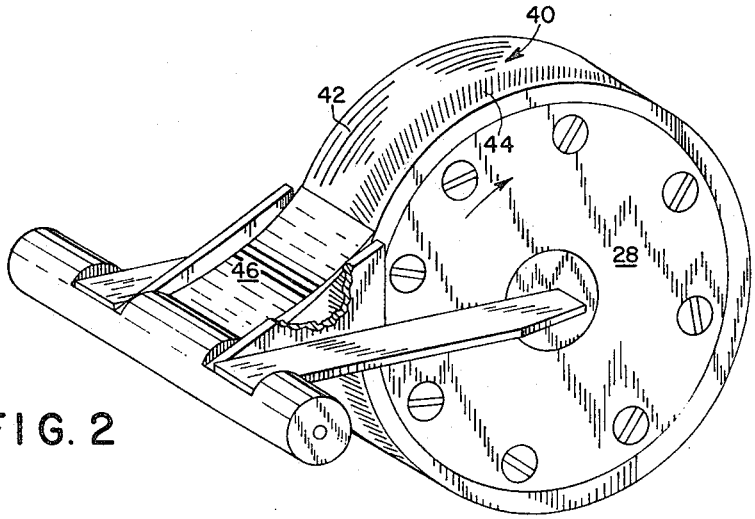
Figure 3:
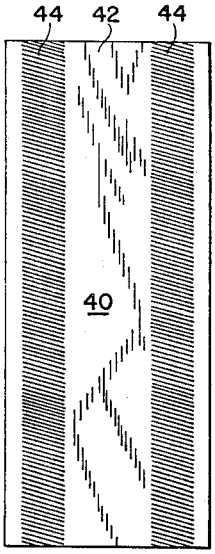
Figure 4:
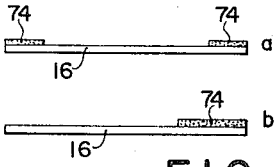
Figure 5:
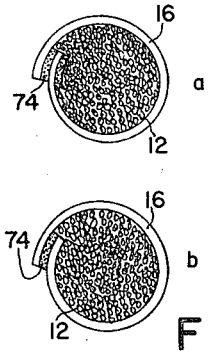

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 7, 1970

873 O.G. 17

T873,001
MELT ADHESIVE APPLICATOR

Phara Lee Cobb, Jr., P.O. Box 511,
Kingsport, Tenn. 37662

Filed July 15, 1968, Ser. No. 744,722
Int. Cl. D04h *3/00;* A24d *1/06*
U.S. Cl. 156—438
2 Sheets Drawing. 12 Pages Specification

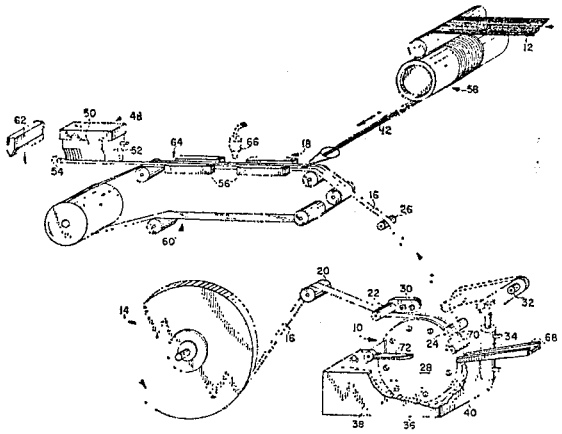

An apparatus for the manufacture of tobacco smoke filter rods said apparatus containing a melt adhesive applicator for applying an adhesive composition to tobacco smoke filter wrap material. The adhesive applicator includes an engraved applicator roll partially immersed in a molten bath of adhesive composition, a doctor blade positioned against the roll and a guide roller system for the wrap material all of which together function to bring the wrap and roll into contact so that the adhesive composition is first deposited on the applicator roll and then on the wrap material.

April 7, 1970 P. L. COBB, JR T873,001

MELT ADHESIVE APPLICATOR

Filed July 15, 1968 2 Sheets-Sheet 1

PHARA L. COBB, JR.
INVENTOR.

BY William T. French
Leigh B. Taylor

ATTORNEYS

MELT ADHESIVE APPLICATOR

Filed July 15, 1968 2 Sheets-Sheet 2

PHARA L. COBB, JR.
INVENTOR.

BY William J. French
Leigh B. Taylor
ATTORNEYS